(12) United States Patent
Cordeiro et al.

(10) Patent No.: US 8,711,784 B2
(45) Date of Patent: Apr. 29, 2014

(54) BEACONING AND SUPERFRAME STRUCTURE FOR MILLIMETER WAVE WIRELESS TECHNOLOGIES

(75) Inventors: Carlos Cordeiro, Portland, OR (US); Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 12/321,957

(22) Filed: Jan. 26, 2009

(65) Prior Publication Data

US 2009/0232106 A1    Sep. 17, 2009

Related U.S. Application Data

(60) Provisional application No. 61/035,480, filed on Mar. 11, 2008.

(51) Int. Cl.
*H04W 4/00* (2009.01)

(52) U.S. Cl.
USPC .......................................... 370/329; 370/338

(58) Field of Classification Search
USPC .......... 370/338, 329, 235, 331, 254; 709/236; 455/3.01
See application file for complete search history.

(56) References Cited

U.S. PATENT DOCUMENTS

| | | | | |
|---|---|---|---|---|
| 7,460,503 | B2 * | 12/2008 | Young | 370/331 |
| 7,889,701 | B2 * | 2/2011 | Malik et al. | 370/334 |
| 7,907,562 | B2 * | 3/2011 | Murty et al. | 370/328 |

* cited by examiner

*Primary Examiner* — Chandrahas Patel
(74) *Attorney, Agent, or Firm* — John F. Travis

(57) ABSTRACT

According to aspects of the embodiments, there is provided a method and apparatus for communicating in a wireless network with a MAC layer that uses multi-level beacons, the multi-level beacons including a discovery beacon which is transmitted in an omni mode and an announcement beacon/frame transmitted in a beamformed mode.

19 Claims, 1 Drawing Sheet

ABSTRACT

BEACONING AND SUPERFRAME STRUCTURE FOR MILLIMETER WAVE WIRELESS TECHNOLOGIES

CROSS REFERENCED TO RELATED APPLICATIONS

This application claims the benefit under 35 U.S.C. §119 (e) to U.S. Provisional Patent Application No. 61/035,480, filed Mar. 11, 2008 and is hereby incorporated by reference in its entirety.

BACKGROUND

Wireless Personal Area Networks (WPAN) communication systems are extensively used for data exchange between devices over short distances of no more than 10 meters. Current WPAN systems exploit the frequency band in the 2-7 GHz frequency band region and achieve throughputs of up to several hundred Mbps (for Ultra-WideBand systems).

The availability of 7 GHz of unlicensed spectrum in the 60 GHz band and the progress in the RF IC semiconductor technologies are pushing the development of the millimeter-Wave (mmWave) WPAN systems which will operate in the 60 GHz band and will achieve the throughputs of about several Gbps. Currently a number of standardization groups (Institute for Electronic and Electrical Engineers (IEEE) 802.15.3c, IEEE 802.11ad, Wireless HD SIG, ECMA TG20) are working on the development of the specifications for such mmWave WPAN networks. The standards are developed mainly as addendums to the previous WPAN standards with the introduction of new PHY layers and also are trying to reuse most of the MAC functionality. However, the modifications to the MAC layer are also required to exploit specific mmWave WPAN characteristics.

A communication link operating at 60 GHz is less robust due to the inherent characteristics of high oxygen absorption and significant attenuation through obstructions. In order to satisfy the link budget requirement, directional antennas have been envisioned to be used in creating a mmWave communication link.

Even if directional antennas are available, for initial device discovery, association and synchronization, the use of omni (or quasi-omni) beacons is typically required. The way a station (STA) performs an omni directional transmission changes according to the antenna type employed, but the bottom line is that regardless of how it is accomplished, the overhead associated with omni transmissions is very high since omni frames are transmitted at very low data rates (few Mbps) as compared to the multi-Gbps data rates that are used for directional transmissions.

Future mmWave WPAN will widely use directional antennas. The high gain of the directional antennas will be required to achieve the necessary signal to noise ratio (SNR) margins over very wide bandwidth (~2 GHz) mmWave WPAN links under the limited (~10 dBm) transmitted power. The high-gain antennas may have to be steerable in order to support arbitrary placement of different devices (e.g. to not be limited to fixed positions).

Thus, a strong need exists for new techniques and improvements in millimeter wave wireless technologies.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
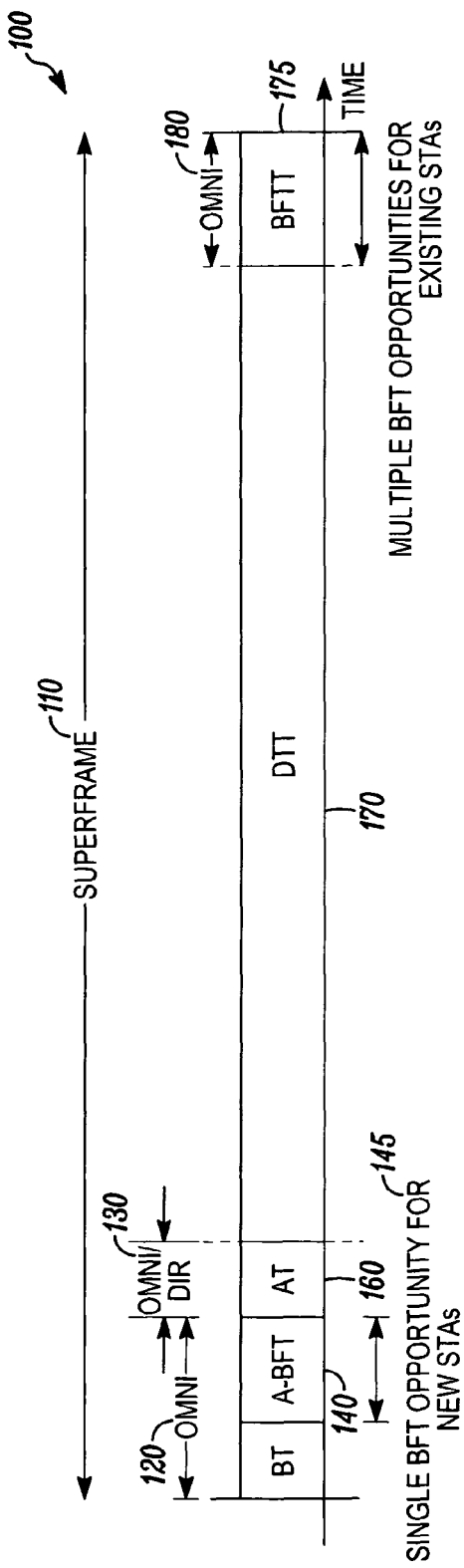
FIG. 1 illustrates a Superframe structure wherein a Discovery Beacon (DB) is transmitted during the Beacon Time (BT), while Announcement Beacons/Frames (ABs) are transmitted during the Announcement Time (AT) according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a novel multiple level (such as two-level) beacon mechanism, consisting of low-rate omni discovery beacons and high-rate directional announcement beacons/frames. Discovery beacons may carry only essential information to enable network entry and initialization, and this may include the transmitter (e.g., PNC) ID, timing information, association period signaling, etc. Announcement beacons carry full information required for regular network operations, such as channel scheduling, management and security information, etc.

It is critical that the beaconing mechanism in mmWave systems be designed in such a way to maximize efficiency. To accomplish this, embodiments of the present invention provide that multi-level beacons be used. In particular, for mmWave systems an embodiment of the present may provide a two-level beaconing mechanism comprised of two types of beacons:

Discovery beacon (DB): this beacon is transmitted in (a low-rate) omni mode. It allows new STAs to discover and potentially join the network (i.e., piconet), in addition to serving currently associated STAs. The DB may be a broadcast frame.

Announcement beacon/frames (AB): this beacon/frame is transmitted in (a high-rate) beamformed mode. This frame/beacon may be transmitted by, say, the piconet coordinator (PNC) and targets piconet STAs that are beamformed with the PNC and may be already associated. The AB is a unicast frame addressed to a particular STA and may require the receiving STA to transmit back another frame in response to the reception of the AB frame.

The structure of the superframe 110 is shown generally as 100 of FIG. 1. The DB is transmitted during the Discovery Time (DT), while the announcement beacons/frames are transmitted during the Announcement Time (AT) 160. The Data Transfer Time (DTT) 170 is used for the actual data communications amongst STAs which are part of the network, the Association Beamforming Training (A-BFT) 140 is used for beamforming training of a new STA 145 attempting association with the network, and the Beamforming Training Time (BFTT) 175 is for beamforming amongst STAs that are already associated with the network.

Since the DB is less efficient than the AB (since it is transmitted in omni mode), it does not need to be transmitted in every superframe. One of the primary purposes of the DB and AB is synchronization. Hence, a STA must receive either the discovery beacon or announcement beacon/frame to be considered synchronized. If a STA misses a consecutive number of beacons from the PNC, it is considered not synchronized. In this case, the STA shall stop transmissions during the DTT and must restart the piconet joining procedure.

While the DB is sent in omni mode 120, 180 (Omni/Dir is shown at 130) with the intention to be received by all of a PNC's neighbors, the announcement frame/beacon is a high-rate transmitted only to a subset of the beamformed and, most of the time, associated STAs. This allows the PNC flexibility in balancing aspects such as discovery latency and performance. Announcement beacons are also more conducive to better spatial reusability since these beacons are always transmitted in beamformed mode, and provide better efficiency when the number of supported antenna elements is higher than the number of STAs associated with the PNC.

Figure 2:
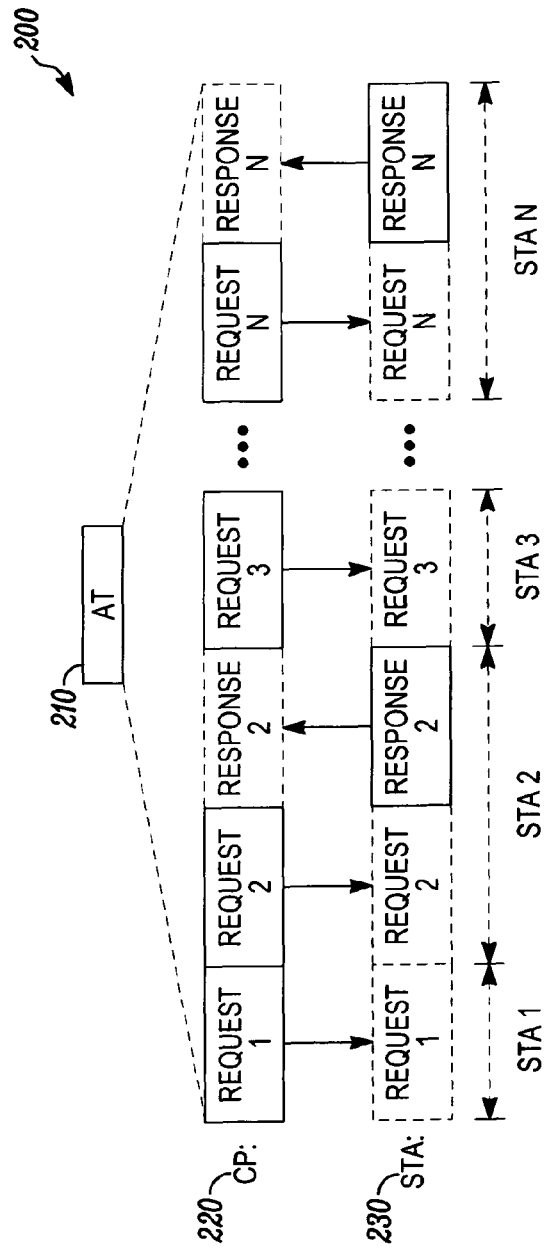
FIG. 2 illustrates a structure of the AB period (AT) according to embodiments of the present invention.

FIG. 2, shown generally as 200, illustrates the structure of the AT period 210 where AB frames are exchanged. Each Request frame shown in FIG. 2 is a general name for an AB frame, and could be, for example, replaced by any of the management frames present in IEEE 802.11. The Request frame is a unicast and directed frame addressed to a particular STA and carries, for example and not by way of limitation, the channel time scheduling of the network. For each Request frame, there must be a response from the addressed receiver. This response may be a management frame (e.g., association request, channel time allocation request) or, if there is no management frame to be transmitted, simply an ACK.

Because for each Request there is a Response frame, this allows the PNC 220 and STA 230 to monitor and maintain the beamformed link between them. If the PNC does not receive a response frame after it transmits a request frame to a STA, it may conclude that the link is no longer valid and may reschedule the beamforming between the PNC and the affected STA.

Multiple Request/Response frame exchanges can take place during the AT 210. Also, Request and Response transmissions between the PNC 220 and a STA 230 may occur more than once over the same AT 210.

To minimize overhead associated with omni transmissions, information carried in DB is kept to a minimum and may include the PNC ID, timing information, number of beacon transmissions left (in case of directional beacons), etc. In contrast, since it is transmitted in high-rate, the announcement beacon/frame contains all the necessary information required to make the network function, such as channel scheduling, control and management information, piconet synchronization information, etc.

To improve efficiency, DBs may not be present in every superframe. If DBs are used infrequently, then the piconet performance can be substantially improved since less overhead will be paid in using low-rate omni transmissions.

If a PNC wants to serve multiple associated STAs in a superframe, the PNC can transmit multiple announcement frames/beacons during the AT period of that superframe. The announcement beacon contains the superframe time allocation including when the PNC will be ready to receive from and/or transmit to the STA. This allows STAs who receive an announcement frame/beacon to synchronize their schedule with that of the PNC.

Finally, for STAs that are in power save mode, the PNC does not send them announcement beacon/frames.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for station discovery and information exchange in a millimeter-wave (mmW) communication system, comprising:
communicating in a wireless network implementing a superframe structure having multi-level beacons corresponding to a respective one of a plurality of data rates, said multi-level beacons including a Discovery beacon (DB) which is transmitted in an omni mode and an announcement beacon/frame (AB) transmitted in a beamformed mode;
wherein in the superframe structure said DB is transmitted during a Discovery Time (DT), while said AB is transmitted during an Announcement Time (AT) and wherein a Data Transfer Time (DTT) is used for actual data communications amongst networked STAs and Association Beamforming Training (A-BFT) is used for beamforming training of a new STA attempting association with said network, and Beamforming Training Time (BFTT) is for beamforming amongst STAs that are already associated with said network;
wherein in addition to serving currently associated stations (STAs) said DB is transmitted by a piconet coordinator (PNC) that allows new STAs to discover and potentially join said wireless network and wherein the AB is a unicast frame addressed to a particular station (STA).

2. The method of claim 1, wherein said AB is transmitted to target stations (STAs) that are beamformed.

3. The method of claim 1, wherein when in a power save mode said PNC does not send announcement beacon/frames to any STAs.

4. The method of claim 2, wherein said communicating is within a wireless personal area network (WPAN).

5. The method of claim 1, wherein said AB is a high-rate unicast frame and said DB is a low-rate broadcast frame.

6. The method of claim 1, wherein to improve efficiency, said DB may not be transmitted in every superframe and wherein if said PNC wants to serve multiple associated STAs in a superframe, said PNC can transmit multiple ABs on said superframe.

7. The method of claim 6, wherein said ABs contains superframe time allocation including when said PNC will be ready to receive from and/or transmit to said STA which allows STAs who receive an announcement frame/beacon to synchronize their schedule with that of the PNC.

8. The method of claim 1, wherein to minimize overhead associated with omni transmissions, information carried in said DB is kept to a minimum and said AB contains all necessary information required to make said network function.

9. A non-transitory machine-accessible medium that provides instructions, which when accessed, cause a machine to perform operations comprising:
communicating in a wireless network implementing a superframe structure having multi-level beacons corresponding to a respective one of a plurality of data rates, said multi-level beacons including a Discovery beacon (DB) which is transmitted in an omni mode and an announcement beacon (AB) transmitted in a beamformed mode;
wherein in the superframe structure said DB is transmitted during a Discovery Time (DT), while said AB is transmitted during an Announcement Time (AT) and wherein a Data Transfer Time (DTT) is used for actual data communications amongst network STAs and Association Beamforming Training (A-BFT) is used for beamforming training of a new STA attempting association with said network, and Beamforming Training Time (BFTT) is for beamforming amongst STAs that are already associated with said network;
wherein said DB is transmitted by a piconet coordinator (PNC) that allows new STAs to discover and potentially join said wireless network and wherein the AB is a unicast frame addressed to a particular station (STA), in addition to serving currently associated STAs.

10. The non-transitory machine-accessible medium of claim 9, wherein said AB is a unicast frame addressed to a particular STA.

11. The non-transitory machine-accessible medium of claim 10, wherein said AB is a high-rate unicast frame and said DB is a low-rate broadcast frame.

12. An apparatus, comprising:
a transceiver adapted to communicate in a wireless network implementing a superframe structure having multi-level beacons corresponding to a respective one of a plurality of data rates, said multi-level beacons including a Discovery beacon (DB) which is transmitted in an omni mode and an announcement beacon (AB) transmitted in a beamformed mode;
wherein in the superframe structure said DB is transmitted during a Discovery Time (DT), while said AB is transmitted during an Announcement Time (AT) and wherein a Data Transfer Time (DTT) is used for actual data communications amongst network STAs and Association Beamforming Training (A-BFT) is used for beamforming training of a new STA attempting association with said network, and Beamforming Training Time (BFTT) is for beamforming amongst STAs that are already associated with said network;
wherein in addition to serving currently associated stations (STAs) said DB is transmitted by a piconet coordinator (PNC) that allows new STAs to discover and potentially join said wireless network and wherein the AB is a unicast frame addressed to a particular station (STA).

13. The apparatus of claim 12, wherein said AB is transmitted to target stations (STAs) that are beamformed to said transceiver.

14. The apparatus of claim 13, wherein said communicating is within a wireless personal area network (WPAN).

15. The apparatus of claim 12, wherein said AB is a high-rate unicast frame and said DB is a low-rate broadcast frame.

16. The apparatus of claim 12, wherein when in a power save mode said PNC does not send announcement beacon/frames to any STAs.

17. The apparatus of claim 12, wherein to minimize overhead associated with omni transmissions, information carried in said DB is kept to a minimum and said AB contains all necessary information required to make said network function.

18. The apparatus of claim 12, wherein to improve efficiency, said DB may not be present in every superframe and wherein if said PNC wants to serve multiple associated STAs in a superframe, said PNC can transmit multiple ABs on said superframe.

19. The apparatus of claim 18, wherein said ABs contains superframe time allocation including when said PNC will be ready to receive from and/or transmit to said STA which allows STAs who receive an announcement frame/beacon to synchronize their schedule with that of the PNC.

* * * * *